(12) United States Patent
Schneider et al.

(10) Patent No.: US 11,084,478 B2
(45) Date of Patent: Aug. 10, 2021

(54) DEVICE FOR OPERATING A HYDRAULIC BRAKE SYSTEM, BRAKE SYSTEM

(71) Applicant: Robert Bosch GmbH, Stuttgart (DE)

(72) Inventors: Frank Schneider, Ilsfeld (DE); Dieter Blattert, Kirchheim/Neckar (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 15/712,473

(22) Filed: Sep. 22, 2017

(65) Prior Publication Data

US 2018/0148032 A1    May 31, 2018

(30) Foreign Application Priority Data

Nov. 30, 2016 (DE) .................... 10 2016 223 780.2

(51) Int. Cl.
| | |
|---|---|
| *B60T 17/22* | (2006.01) |
| *B60T 13/74* | (2006.01) |
| *B60T 13/66* | (2006.01) |
| *B60T 7/04* | (2006.01) |
| *B60T 13/68* | (2006.01) |
| *B60T 13/14* | (2006.01) |
| *B60T 7/22* | (2006.01) |
| *B60T 13/58* | (2006.01) |

(52) U.S. Cl.
CPC .............. *B60T 17/22* (2013.01); *B60T 7/042* (2013.01); *B60T 7/22* (2013.01); *B60T 13/146* (2013.01); *B60T 13/588* (2013.01); *B60T 13/662* (2013.01); *B60T 13/686* (2013.01); *B60T 13/741* (2013.01); *B60T 13/745* (2013.01); *B60T 2230/00* (2013.01)

(58) Field of Classification Search
CPC .......... B60T 7/042; B60T 7/22; B60T 13/588; B60T 13/745; B60T 13/146; B60T 13/662; B60T 13/686; B60T 13/741; B60T 17/22; B60T 2230/00
See application file for complete search history.

(56) References Cited

U.S. PATENT DOCUMENTS

| | | | |
|---|---|---|---|
| 2004/0193348 A1* | 9/2004 | Gray .................... | A01B 69/008 701/50 |
| 2011/0048863 A1* | 3/2011 | Schroeder-Brumloop .................. | B66B 5/0093 187/359 |

(Continued)

FOREIGN PATENT DOCUMENTS

DE    10 2010 040 573 A1    3/2012

*Primary Examiner* — Melody M Burch
(74) *Attorney, Agent, or Firm* — Maginot, Moore & Beck LLP

(57) ABSTRACT

A method for operating a hydraulic brake system of a motor vehicle includes generating a force for displacing a brake piston of a wheel brake of the brake system for the actuation thereof via a pressure generator and an electromechanical actuator of the brake system. The method further includes actuating one or more of the pressure generator and the actuator to set a parking brake function and monitoring the operability of the brake system. The method further includes monitoring the actuator for a change of the operating state thereof, and suspending the monitoring for a specifiable period of time depending on a detected change.

9 Claims, 4 Drawing Sheets

(56) References Cited

U.S. PATENT DOCUMENTS

| | | | | |
|---|---|---|---|---|
| 2011/0049971 A1* | 3/2011 | Sano | ................ | B60T 7/042 |
| | | | | 303/6.01 |
| 2014/0098789 A1* | 4/2014 | Liu | ................ | H04W 76/10 |
| | | | | 370/331 |
| 2014/0305751 A1* | 10/2014 | Yamamoto | ............ | B60T 8/00 |
| | | | | 188/72.4 |
| 2015/0081192 A1* | 3/2015 | Pongracz | ......... | B60W 50/0205 |
| | | | | 701/99 |
| 2015/0127235 A1* | 5/2015 | Moessner | ............ | B60T 17/22 |
| | | | | 701/70 |

\* cited by examiner ns. # DEVICE FOR OPERATING A HYDRAULIC BRAKE SYSTEM, BRAKE SYSTEM This application claims priority under 35 U.S.C. § 119 to patent application no. DE 10 2016 223 780.2, filed on Nov. 30, 2016 in Germany, the disclosure of which is incorporated herein by reference in its entirety.

BACKGROUND

The disclosure concerns a method for operating a hydraulic brake system of a motor vehicle, characterized in that the brake system comprises at least one wheel brake, a brake pedal device and at least one actuatable pressure generator for hydraulic actuation of the brake and an electromechanical actuator associated with the wheel brake for actuating the wheel brake, characterized in that a force can be generated by each of the pressure generator and actuator for displacing a brake piston of the wheel brake for the actuation thereof, characterized in that the pressure generator and/or the actuator are actuated for setting a parking brake function, and characterized in that the operability of the brake system is monitored.

The disclosure further concerns a device for operating such a brake system and a corresponding brake system.

Methods, devices and brake systems of the aforementioned type are known from the prior art. Most brake systems in motor vehicles operate hydraulically, characterized in that by operating a brake pedal of a brake pedal device a driver produces a hydraulic pressure, which for example is passed by a brake force booster, a master brake cylinder and a plurality of valves to one or a plurality of wheel brakes. The hydraulic pressure acts on a brake piston of the respective wheel brake in order to displace the brake to produce a clamping force between brake linings and a brake disk. Meanwhile, wheel brakes are also known that comprise an integrated actuator, which can also exert a force on the brake piston electromechanically in order to produce a clamping force. Said actuator is usually part of a parking brake device of a brake system and is used to set the clamping force permanently, so that the clamping force can be maintained and the motor vehicle can be held at a standstill without further energy consumption. In principle, it is possible to implement the parking brake function by the actuator alone. However, in order to achieve a greater parking brake force, it is known to actuate the pressure generator at the same time as the actuator, so that the brake piston is subjected to a force both hydraulically and electromechanically. The pressure generator can be implemented as part of the brake pedal device or integrated within the respective brake circuit.

For example, it is conceivable that the pressure generator is implemented as an electrohydraulic brake force booster and provides the parking brake force hydraulically as required.

Moreover, it is known to monitor the operability of the brake system during the operation of the motor vehicle in order to avoid a drop in hydraulic pressure being detected too late or a parking brake function no longer being able to be guaranteed. From the application document DE 10 2010 040 573 A1, it is known for example to monitor an operating variable of the actuator in order to detect a fault in the hydraulic system. The actuator operates faster than the pressure generator, so that the actuator can overtake the pressure generator, so that the brake piston is displaced faster by the actuator than the hydraulic medium provided by the pressure generator can flow into the volume that is freed by the displacement of the brake piston, whereby the hydraulic pressure decreases briefly. Owing to the hydraulic pressure reduction, this can result in a fault in the hydraulic system being detected although there is no fault.

SUMMARY

The method according to the disclosure has the advantage that the monitoring of the hydraulic brake system is more reliable and in particular does not detect as a fault a drop in hydraulic pressure or a corresponding increase in hydraulic pressure that is perhaps not desired but that is caused by the nature of the brake system. According to the disclosure, this is achieved by monitoring the actuator for a change in the operating state thereof, in particular for a drop in pressure, and suspending the monitoring for a specifiable period of time depending on a detected change. This has the advantage that the time in which a drop in pressure or an increase in pressure can occur without there being a fault is bridged. Whereas to date on detecting a fault in the brake system by the monitoring, the monitoring of at least parts of the brake system may have been permanently deactivated, with the configuration according to the disclosure only a pause in the monitoring is carried out, at the end of which the monitoring is resumed. As a result, greater availability overall of the monitoring in the brake system is guaranteed.

According to an advantageous development of the disclosure, it is provided that the monitoring is suspended if it has been determined that the actuator is starting to move in order to produce a displacement of the brake piston. Thus, the activation of the actuator to produce a braking force, in particular a clamping force, is selected as an operating state that is relevant to the suspended monitoring. In particular, in this case it can occur that the actuator overtakes the pressure generator, so that the hydraulic pressure in the brake system reduces. Therefore, the aforementioned advantages result.

Alternatively or in addition, it is preferably provided that the monitoring, in particular for a drop in pressure, is suspended if the actuator signals a "tightening" status. In this case, it is provided that the actuator automatically signals the status thereof to the brake system, in particular to a control unit of the brake system. For this purpose, the actuator either sends the operating status thereof at regular intervals or preferably signals a status change in each case, for example of "deactivated to tightening" or "deactivated to releasing" or similar. If such a status change is detected by the brake system, the monitoring is suspended, possibly even before the actuator actually exerts a force on the brake piston.

Furthermore, it is preferably provided that the monitoring is suspended if the actuator signals a "releasing" status. Whereas in the "tightening" status the actuator applies a force to the brake piston such that a clamping force is produced and a ventilation gap 5 is overcome, in the case of the "releasing" status the brake piston moves in the opposite direction in order to release the wheel brake and reduce the braking force.

According to a preferred development, it is provided that the actuator signals or sends the status message with a change of the status. As already mentioned, this enables the timely suspension of monitoring in order to avoid a misdiagnosis.

Furthermore, it is preferably provided that the period of time for which the monitoring is suspended is specified depending on an anticipated movement time of the brake piston. The monitoring is thus suspended for as long as the brake piston is expected to be moving. As a result, the period is bridged within which the misdiagnosis could occur owing to an increased or reduced hydraulic pressure.

Furthermore, it is preferably provided that when suspending the monitoring the detection of measurement data and/or the analysis of measurement data is deactivated. If the monitoring is suspended, then for example the detection of measurement data, such as for example of measurement variables relating to the electromechanical actuator, can be deactivated. For this purpose, for example a pressure sensor can be deactivated, whereby energy is saved. Alternatively or in addition, only the analysis of the measurement data is deactivated. Furthermore, this means that the measurement data is obtained, but the analysis thereof is not carried out during the monitoring, so that a misdiagnosis is avoided.

The device according to the disclosure is characterized by a control unit that is specifically designed to carry out the method according to the disclosure when used properly. As a consequence of this, the aforementioned advantages result. The brake system according to the disclosure is characterized by the control unit according to the disclosure. As a consequence of this, the aforementioned advantages result.

Further advantages and preferred features and combinations of features arise in particular from the aforementioned description and from the claims.

BRIEF DESCRIPTION OF THE DRAWINGS

The disclosure is described in detail below using the drawings. For this purpose, in the figures.

DETAILED DESCRIPTION

Figure 1:
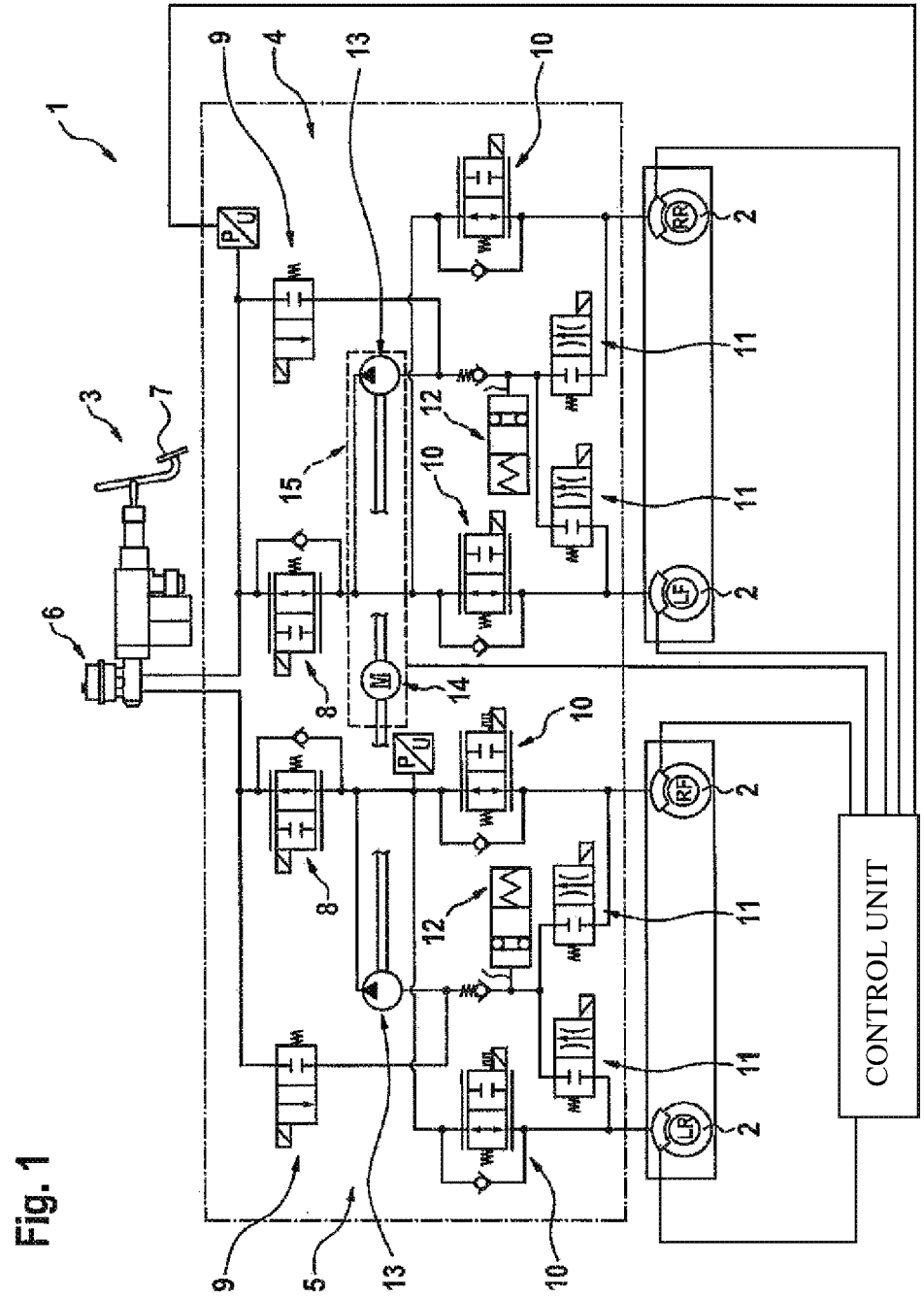
FIG. 1 shows a brake system of a motor vehicle in a simplified representation.

FIG. 1 shows in a simplified representation a brake system 1 for a motor vehicle that is not shown in detail here. The brake system 1 comprises a plurality of wheel brakes 2 that can be actuated as service brakes by a driver of the motor vehicle using a brake pedal device 3. In this case, the wheel brakes 2 are designated by LR, RF, LF and RR, whereby the position thereof or the assignment to the motor vehicle is described, characterized in that LR stands for left rear, RF for right front, LF for left front and RR for right rear. Two brake circuits 4 and 5 are implemented between the brake pedal device 3 and the wheel brakes 2, characterized in that the brake circuit 4 is associated with the wheel brakes LF and RR and the brake circuit 5 is associated with the wheel brakes LR and RF. The two brake circuits 4 and 5 are implemented identically, so that the design of both brake circuits 4, 5 will be described in detail below using the brake circuit 4.

The brake circuit 4 is first connected to a master brake cylinder 6 of the brake pedal device 3, characterized in that moreover the brake pedal device 3 comprises a brake pedal 7 that can be operated by the driver and a brake force booster. The brake circuit 4 comprises a changeover valve 8 and a high pressure switching valve 9 that are connected in parallel with each other and are disposed downstream of the master brake cylinder 6. The changeover valve 8 is implemented to be normally open and enables a flow of the hydraulic medium of the brake circuit, i.e. the brake fluid, in both directions. The high pressure switching valve 9 is implemented to be normally closed and enables a through-flow of brake fluid towards the wheel brakes 2 when in the energized state. The changeover valve 8 is furthermore connected to the two wheel brakes 2 with the interposition of an inlet valve 10 that is implemented to be normally open in both directions. Moreover, in each case a normally closed outlet valve 11 is associated with the wheel brakes 2 of the brake circuit 4. A hydraulic pressure reservoir 12 is connected downstream of the outlet valves 11. On the outlet side, the outlet valves 11 are moreover connected to a suction side of a pump 13, which is connected on the pressure side to the brake circuit 4 between the changeover valve 8 and the inlet valves 10. The pump 13 is mechanically coupled to an electric motor 14, characterized in that the pump 13 and the electric motor 14 together form a pressure generator 15 of the brake system 1. It is provided that the electric motor 14 is associated with the pumps 13 of both brake circuits 4 and 5. Alternatively, it can also be provided that each brake circuit 4, 5 comprises a dedicated electric motor 14. On the pressure side, a respective pressure sensor P/U is associated with the respective pump 13 in each case, characterized in that only one is shown in FIG. 1 for clarity reasons. By means of said pressure sensor P/U, the hydraulic pressure in the respective brake circuit 4, 5 is monitored in order for example to detect a leak in the respective brake circuit 4, 5. Thus for example, a drop in pressure produced in the respective brake circuit 4 and/or 5 as a result of an unwanted leak can be detected.

If the two changeover valves 8 of the brake circuits 4, 5 are closed, then the hydraulic pressure in the downstream section of the brake circuits 4, 5, i.e. between the changeover valves and the wheel brakes 2, remains locked in or maintained, even if the brake pedal 7 is released by the driver.

Figure 2:
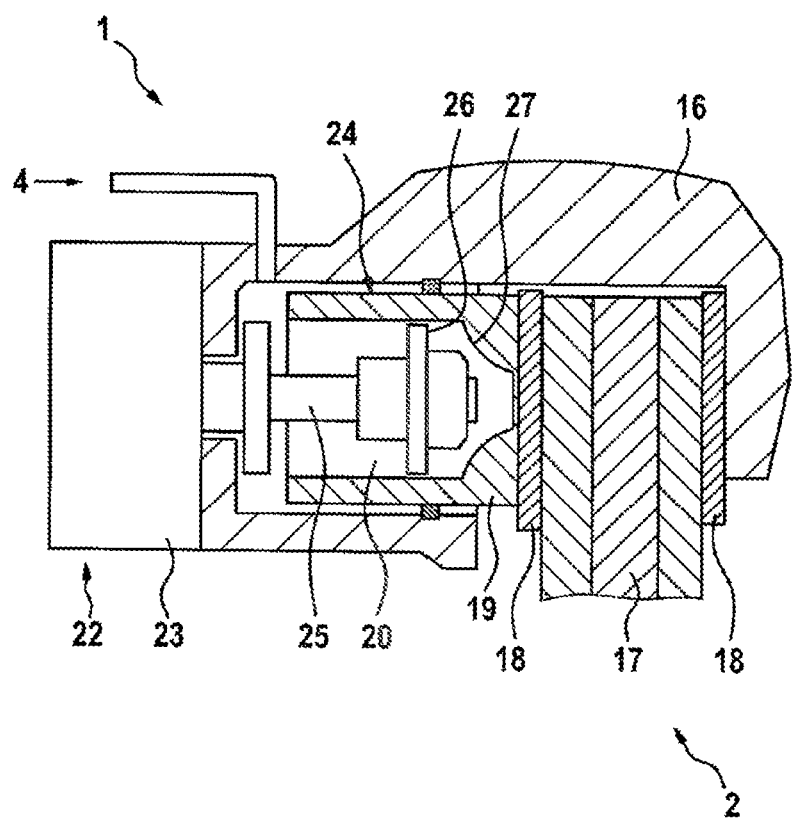
FIG. 2 shows a wheel brake of the brake system in a longitudinal sectional representation.

FIG. 2 shows the design of the wheel brakes 2 in a simplified sectional representation. The respective wheel brake 2 comprises a brake caliper 16 that overlaps a brake disk 17 that is rotationally fixedly connected to a wheel of the motor vehicle at the end face thereof. In this case, a brake lining 18 of the wheel brake 2 is associated with each end face of the brake disk 17. In this case, one of the brake linings 18 is implemented or disposed on an end face of a brake piston 19 that is displaceably supported on the brake caliper 16. The brake piston 19 comprises a cup-shaped structure in the longitudinal section thereof, so that it forms a cavity 20 together with a receptacle 21, in which the brake piston 19 is displaceably supported. At the same time, the cavity 20 is fluidically connected to the inlet valve 10, so that if the inlet valve 10 and the changeover valve 8 are opened and the brake pedal 7 is operated, the hydraulic pressure acts on the brake piston 19 in order to displace the piston against the brake disk 17, whereby the brake disk 17 is tightened or clamped between the brake linings 18 of the wheel brake 2. Alternatively, by closing the changeover valve 8 and actuating the pressure generator 15, the hydraulic pressure is automatically produced in the brake circuit 4. In the present case, this is so if the driver operates a button or switch for actuating a parking brake, or the vehicle is automatically held hydraulically (AVH).

Moreover, an electromechanical actuator 22 that comprises an electric motor 23 and a gearbox 24 that works in conjunction with the electric motor 23 is associated with the brake piston 19. The gearbox is implemented as a spindle gearbox that comprises a spindle 25 that is rotationally fixedly connected to the electric motor 23 and a spindle nut 26 that is rotationally fixedly supported in the brake piston 19 and longitudinally displaceable on the spindle 25. If the spindle is driven by the electric motor 23, then as a result the spindle nut 26 is longitudinally displaced in the brake piston 19. During this, the spindle nut 26 is displaced by the rotary motion of the spindle 25 to the extent that the spindle comes into contact with an axial stop 27 of the brake piston 19 in the cavity 20, whereby the brake piston 19 is taken along with the spindle nut 26. By actuating the actuator 22, thereby a force can also be applied to the brake piston 19 to displace the piston, characterized in that said force can be overlaid by or can overlay the force applied by the hydraulic pressure.

More robust monitoring of the brake system 1 is carried out with increased system availability by the method described below, which is carried out by a control unit that is not illustrated here of the brake system 1.

At the vehicle level, the overall function and the availability of the brake system 1 is determined therefrom and is controlled. Based on the functional monitoring of the subsystems, functional monitoring is activated or deactivated. As a result, overall reliability is increased.

Figure 3:
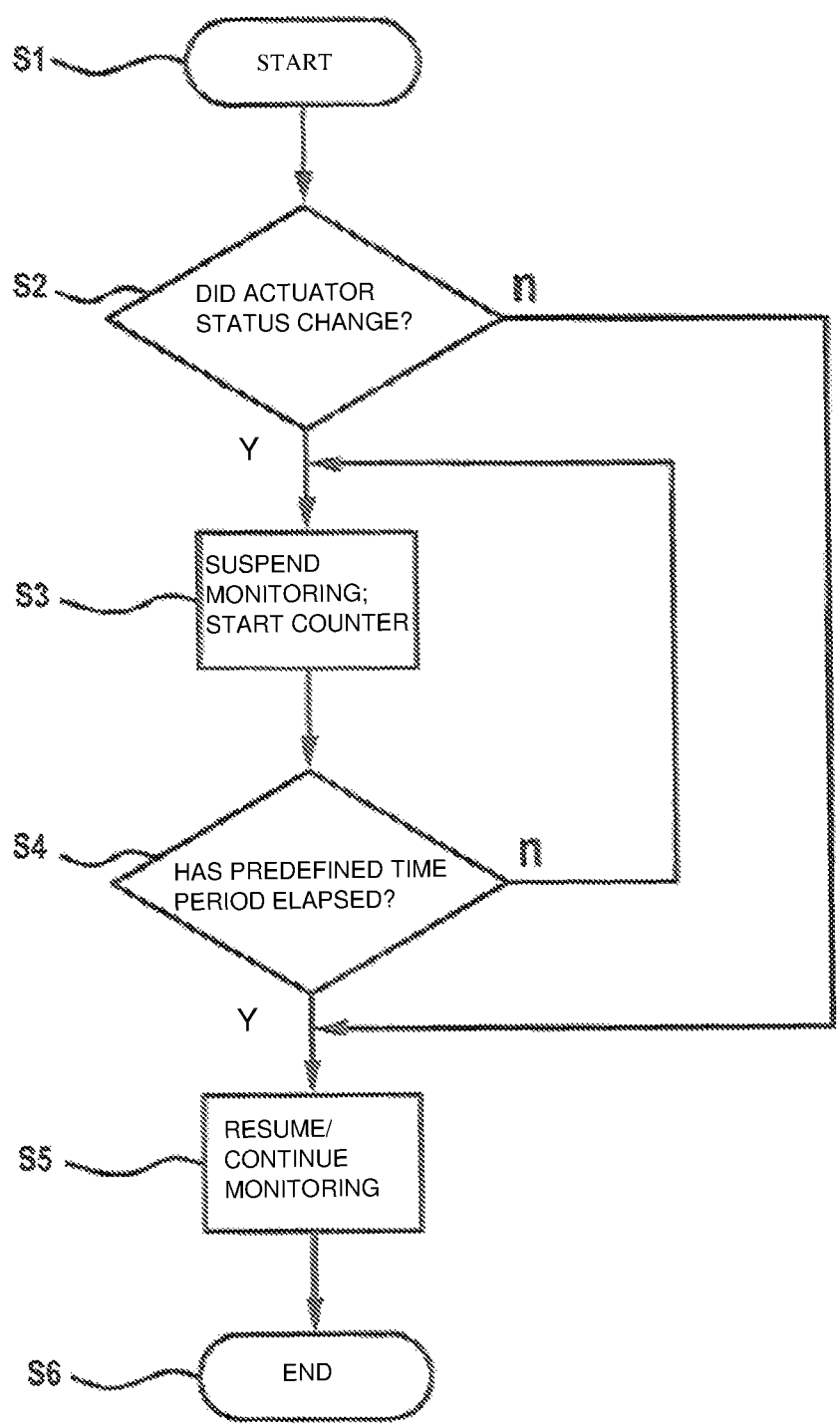
FIG. 3 shows an advantageous method for operating the brake system and FIG. 4 shows a diagram for describing the advantageous method.

Using a flow chart, FIG. 3 shows the advantageous method that starts in step S1 with starting up the motor vehicle or monitoring the brake system 1. During the monitoring, in particular the hydraulic pressure present in the respective brake circuit 4, 5 is monitored by means of the respective pressure sensor P/U in order to determine whether the respective brake circuit 4, 5 is working properly and for example not experiencing an unwanted leak. Then a status change of the actuator 22 is monitored in a query S2. If the status changes from "locked" or from "open" to "tightening" (j), then the process continues in the step S3.

In the step S3, the monitoring of the operation of the brake system 1 is suspended, either by deactivating the detection of measurement data or suspending the analysis of the measurement data. The measurement data is in particular measurement variables of the actuator 22, such as in particular the operating current of the actuator 22, which changes with the load on the brake piston and the movement thereof. Thus, the pressure monitoring of the brake system is deactivated. With the suspension of the monitoring, a counter starts to run.

In the subsequent query S4, the elapsed time is compared with a specifiable limit that defines a specified period of time. Said period of time or the limit is in particular specified depending on an anticipated period of movement of the brake piston 19. In this case, the period of movement comprises the start of the movement of the brake piston from for example the released position to the end of the movement of the piston in the tightened position or vice-versa. If the period of time in step S4 has not yet elapsed (n), then the process returns to the step S3. But if the time has elapsed (j), then in a subsequent step S5 the monitoring is re-activated and the method is terminated in the step S6. The method is started whenever the brake system 1 is checked for a drop in pressure.

On start-up, the status of the actuator is continuously monitored according to step S2. If the status of the actuator does not change (n), then the process goes directly to the step S5 or the monitoring of the brake system 1 is maintained. The method only takes a status change into account, whereas the static state of the actuator 22 is not taken into account for the monitoring of the hydraulic brake system. As a result, a particularly simple and inexpensive method is implemented.

Figure 4:
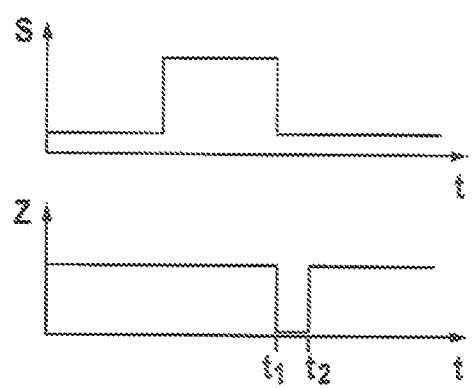

FIG. 4 shows the status information S of the actuator 22 and the state Z of the monitoring according to the described method plotted against time (t) in a diagram in order to illustrate the above. In the event of the change in state from open to closed of the actuator or of the wheel brake 2 by the actuator 22, a pressure change (drop in pressure) takes place in the master brake cylinder 6 or in the respective brake circuit 4 or 5. According to the aforementioned method, the monitoring of the drop in pressure is limited, interrupted or suspended for the period of time between the detection of the status change of the actuator 22 at the point in time t1 and the specified limit value $t_2$, which defines the specified period of time. The specified period of time takes into account in particular the time of actuation until the actuator 22 has displaced the respective wheel brake 2 from the open position into a setpoint position, in particular into a parking brake position. Thus, the monitoring is deactivated only for said time and can contribute to the increase in availability for all other time ranges. This means that the monitoring for a leak in the hydraulic part of the brake system 1 is thus also carried out immediately after starting the driving cycle and can subsequently be carried out into the entire driving cycle or until the brake system 1 or the control unit of the brake system 1 is inactive. The monitoring is only temporarily suspended in the vehicle while the actuator 22 changes the status thereof suitably to set the parking brake function.

What is claimed is:

1. A method for operating a hydraulic brake system of a motor vehicle, the brake system including at least one wheel brake, a brake pedal device, at least one actuatable pressure generator configured to hydraulically actuate the at least one wheel brake, and an electromechanical actuator associated with the at least one wheel brake and configured to actuate the at least one wheel brake, the method comprising:
   generating a force configured to displace a brake piston of the at least one wheel brake so as to actuate the at least one wheel brake, the force generated with each of the at least one pressure generator and the electromechanical actuator;
   actuating one or more of the at least one pressure generator and the electromechanical actuator so as to set a parking brake function;
   monitoring the operability of the brake system; and
   monitoring the electromechanical actuator for a change of the operating state thereof and suspending the monitoring for a specifiable period of time depending on a detected change.

2. The method according to claim 1, wherein the monitoring is suspended if it is determined that the electromechanical actuator starts to move in order to produce a displacement of the brake piston.

3. The method according to claim 1, wherein the monitoring is suspended if the electromechanical actuator signals a tightening status.

4. The method according to claim 1, wherein the monitoring is suspended if the electromechanical actuator signals a releasing status.

5. The method according to claim 1, wherein the electromechanical actuator signals or sends a status message when a change in the status occurs.

6. The method according to claim 1, wherein the period of time is specified depending on an anticipated movement time of the brake piston.

7. The method according to claim 1, wherein during the suspension of the monitoring, one or more of a detection of measurement data and an analysis of measurement data is deactivated.

8. A device for operating a brake system of a motor vehicle, the brake system including at least one wheel brake, a brake pedal device, at least one actuatable pressure generator configured to hydraulically actuate the at least one wheel brake, and an electromechanical actuator associated with the at least one wheel brake and configured to actuate the at least one wheel brake, the device comprising:
- a control unit configured to execute a method for operating the brake system, the control unit specifically configured to:
  - actuate each of the at least one pressure generator and the electromechanical actuator to generate a force configured to displace a brake piston of the at least one wheel brake so as to actuate the at least one wheel brake,
  - actuate one or more of the at least one pressure generator and the electromechanical actuator so as to set a parking brake function,
  - monitor the operability of the brake system, and
  - monitor the electromechanical actuator for a change of the operating state thereof and suspend the monitoring for a specifiable period of time depending on a detected change.

9. A brake system for a motor vehicle, comprising:
- at least one wheel brake;
- a brake pedal device;
- at least one electrohydraulic pressure generator configured to hydraulically actuate the at least one wheel brake;
- an electromechanical actuator associated with the at least one wheel brake and configured to actuate the at least one wheel brake; and
- a control unit configured to execute a method for operating the brake system, the control unit specifically configured to:
  - actuate each of the at least one pressure generator and the electromechanical actuator to generate a force configured to displace a brake piston of the at least one wheel brake so as to actuate the at least one wheel brake,
  - actuate one or more of the at least one pressure generator and the electromechanical actuator so as to set a parking brake function,
  - monitor the operability of the brake system, and
  - monitor the electromechanical actuator for a change of the operating state thereof and suspend the monitoring for a specifiable period of time depending on a detected change.

* * * * *